United States Patent
Priedeman, Jr. et al.

(10) Patent No.: US 8,123,999 B2
(45) Date of Patent: Feb. 28, 2012

(54) SMOOTHING METHOD FOR LAYERED DEPOSITION MODELING

(75) Inventors: William R. Priedeman, Jr., Long Lake, MN (US); David Thomas Smith, Rosemount, MN (US)

(73) Assignee: Stratasys, Inc., Eden Prairie, MN (US)

( * ) Notice: Subject to any disclaimer, the term of this patent is extended or adjusted under 35 U.S.C. 154(b) by 917 days.

(21) Appl. No.: 10/511,784

(22) PCT Filed: Apr. 4, 2003

(86) PCT No.: PCT/US03/10220
§ 371 (c)(1),
(2), (4) Date: Oct. 15, 2004

(87) PCT Pub. No.: WO03/089218
PCT Pub. Date: Oct. 30, 2003

(65) Prior Publication Data
US 2005/0173838 A1 Aug. 11, 2005

Related U.S. Application Data

(60) Provisional application No. 60/373,186, filed on Apr. 17, 2002.

(51) Int. Cl.
*B29C 71/00* (2006.01)
(52) U.S. Cl. ............ 264/341; 264/401; 34/73; 34/443
(58) Field of Classification Search ............ 156/244.11; 264/308, 341, 401; 700/119; 34/73, 72, 34/443
See application file for complete search history.

(56) References Cited

U.S. PATENT DOCUMENTS

| | | | |
|---|---|---|---|
| 2,651,811 A | | 9/1953 | Coney |
| 3,020,661 A | * | 2/1962 | Miller et al. .................. 264/341 |
| 3,437,727 A | | 4/1969 | Boyhan et al. |
| 3,737,499 A | | 6/1973 | Kamena |
| 3,807,054 A | * | 4/1974 | Joseph et al. ..................... 34/73 |
| 4,260,873 A | | 4/1981 | Simmonds |
| 4,302,418 A | * | 11/1981 | Cullis et al. .................. 264/341 |
| 4,529,563 A | | 7/1985 | McGinniss |

(Continued)

FOREIGN PATENT DOCUMENTS
GB 1314711 A 4/1973

(Continued)

OTHER PUBLICATIONS

Detrex Corporation Brochure for Model VI-2000, Detrex Electric or Steam Heated Two Dip Vapor/Immersion Degreaser (2 pages), publically available at least as of 1997.

(Continued)

*Primary Examiner* — John Goff
(74) *Attorney, Agent, or Firm* — Brian R. Morrison; Westman, Champlin & Kelly, P.A.

(57) ABSTRACT

Disclosed is a method for smoothing the surface of an object built from a polymeric or wax material using a layered manufacturing rapid prototyping technique. After the object is built it is exposed to a vaporized solvent such as in a vaporizer for an exposure time sufficient to reflow the object surface. A solvent is chosen based on its ability to transiently soften the material which forms the object, and thereafter evaporate off the object. The object is removed from the solvent and allowed to dry, producing a smooth finished part.

18 Claims, 3 Drawing Sheets

U.S. PATENT DOCUMENTS

| | | | |
|---|---|---|---|
| 4,594,311 | A | 6/1986 | Frisch et al. |
| 4,976,813 | A | 12/1990 | Salensky et al. |
| 4,983,223 | A * | 1/1991 | Gessner .................... 134/25.4 |
| 4,999,069 | A | 3/1991 | Brackett et al. |
| 5,039,472 | A | 8/1991 | Salensky et al. |
| 5,045,141 | A | 9/1991 | Salensky et al. |
| 5,059,359 | A | 10/1991 | Hull et al. |
| 5,073,231 | A | 12/1991 | Eschwey et al. |
| 5,121,329 | A | 6/1992 | Crump |
| 5,143,663 | A | 9/1992 | Leyden et al. |
| 5,189,781 | A | 3/1993 | Weiss et al. |
| 5,340,433 | A | 8/1994 | Crump |
| 5,448,838 | A * | 9/1995 | Edmonds ........................ 34/73 |
| 5,653,925 | A | 8/1997 | Batchelder |
| 5,738,817 | A | 4/1998 | Danforth et al. |
| 5,764,521 | A | 6/1998 | Batchelder et al. |
| 5,824,250 | A | 10/1998 | Whalen et al. |
| 5,976,339 | A | 11/1999 | Adnré, Sr. |
| 5,976,457 | A | 11/1999 | Amaya et al. |
| 6,021,358 | A | 2/2000 | Sachs |
| 6,022,207 | A | 2/2000 | Dahlin et al. |
| 6,324,438 | B1 | 11/2001 | Cormier et al. |
| 6,799,959 | B1 | 10/2004 | Tochimoto et al. |

FOREIGN PATENT DOCUMENTS

| | | |
|---|---|---|
| JP | 49-036815 B | 10/1974 |
| JP | 50-026870 A | 3/1975 |
| JP | 52023169 A | 2/1977 |
| JP | 55-054052 A | 4/1980 |
| JP | 2024122 A | 1/1990 |
| JP | 2095831 A | 4/1990 |
| JP | 53-37951 A | 12/1993 |
| JP | 6128398 | 5/1994 |
| JP | 2000-318048 A | 11/2000 |
| JP | 2001048932 (A) | 2/2001 |
| JP | 2001-150556 | 5/2001 |
| WO | 0067981 A1 | 11/2000 |

OTHER PUBLICATIONS

Detrex Corporation Brochure for Model VS-2000, Detrex Electric or Steam Heated Vapor/Spray Degreaser (2 pages), publically available at least as of 1997.

Detrex Corporation Brochure for Vibra Degreasers (2 pages), publically available at least as of Feb. 7, 2002.

Detrex Corporation Brochure for MBW-MINI Compact Cleaning System (2 pages), publically available at least as of Feb. 7, 2002.

Detrex Corporation Brochure for MCS 2000 Cleaning System (2 pages), publically available at least as of Feb. 7, 2002.

Detrex Corporation Brochure for Model MLW Modular Lift Washer (2 pages), publically available at least as of Feb. 7, 2002.

Detrex Corporation Brochure for Model CBW Multi-Stage Cabinetized Rotating Basket Washer (2 pages), publically available at least as of Feb. 7, 2002.

Detrex Corporation Brochure for MBW Industrial Washer Modular Conveyor Cleaning System (2 pages), Copyright 2000.

Detrex Corporation Brochure for Model AQD The Modular Aqueous Cleaning System (4 pages), publically available at least as of 1996.

Detrex Corporation Brochure for Clean Vap Recirculating Hot Water Parts Cleaning System (2 pages), publically available at least as of Feb. 7, 2002.

Detrex Corporation Brochure for Model MR Series (2 pages), publically available at least as of Feb. 7, 2002.

Detrex Corporation Brochure for Solvent Vapor Recovery Systems (2 pages), publically available at least as of Feb. 7, 2002.

"CAD Meets Rapid Prototyping", by Terry Wohlers, *Computer-Aided Engineering*, vol. 11, No. 4, Apr. 1992.

English translation of the Decision of Rejection dated Nov. 9, 2010 for corresponding Japanese Application No.2003-585953.

European Patent No. EP 1501669, granted on Nov. 24, 2010 from national phase of International Patent application No. PCT/US03/10220, counterpart to the present application, with granted claims provided in English, and validated in United Kingdom, Italy, Sweden, Turkey, Spain, France and Germany.

Canadian Patent No. CA 2482848, granted on Oct. 30, 2003 from national phase of International Patent application No. PCT/US03/10220, counterpart to the present application, with granted claims provided in English.

Chinese Patent No. CN 100546799, granted on Oct. 7, 2009 from national phase of International Patent application No. PCT/US03/10220, counterpart to the present application, with granted claims provided in English.

Australian Patent No. AU 2003220651, granted on Nov. 3, 2003 from national phase of International Patent application No. PCT/US03/10220, counterpart to the present application, with granted claims provided in English.

Russian Patent No. RU 2345888, granted on Feb. 10, 2009 from national phase of International Patent application No. PCT/US03/10220, counterpart to the present application, with granted claims provided in English.

Certificate of grant for India Patent No. IN 240156, granted on Apr. 29, 2010 from national phase of International Patent application No. PCT/US03/10220, counterpart to the present application, with granted claims provided in English.

South Korean Patent No. KR 10-0938451, granted on May 20, 2010 from national phase of International Patent application No. PCT/US03/10220, counterpart to the present application, with granted claims provided in English.

\* cited by examiner

SMOOTHING METHOD FOR LAYERED DEPOSITION MODELING

CROSS-REFERENCE TO RELATED APPLICATIONS

This application is a United States national phase entry of PCT International Application No. PCT/US03/10220, filed on Apr. 4, 2003, which claims the benefit of U.S. Provisional Application No. 60/373,186, filed Apr. 17, 2002.

BACKGROUND OF THE INVENTION

The present invention relates to the field of rapid prototyping, and particularly to methods of achieving surface smoothness in prototype objects made by layered manufacturing.

Production and testing of prototype objects is a commonly used step in developing new products, machines and processes in a wide range of industries. A variety of layered manufacturing methods for forming three-dimensional prototypes are known, which develop prototype objects cheaply and quickly from a geometric computer model under computer control. These rapid prototyping methods generally slice or divide a digital representation of a desired object (computer aided design (CAD)) into horizontal layers, then build the object layer-by-layer by repetitive application of materials. Exemplary rapid prototyping techniques include layered deposition modeling, selective laser sintering and stereolithographic processes.

One example of layered deposition modeling is a fused deposition modeling technique performed by Stratasys® FDM® modeling machines. Fused deposition modeling builds up three-dimensional objects by extruding solidifiable modeling material from an extrusion head in a predetermined pattern, layer-by-layer, based upon design data corresponding to the particular shape of each object layer. Examples of extrusion-based apparatus and methods for making three-dimensional objects are described in Crump U.S. Pat. No. 5,121,329, Crump U.S. Pat. No. 5,340,433, Danforth et al. U.S. Pat. No. 5,738,817, Batchelder et al. U.S. Pat. No. 5,764,521 and Dahlin et al. U.S. Pat. No. 6,022,207, all of which are assigned to Stratasys, Inc., the assignee of the present invention.

In the Stratasys® FDM® modeling machines of the current art, modeling material is typically loaded into the machine as a flexible filament wound on a supply reel, such as disclosed in U.S. Pat. No. 5,121,329. A solidifiable material which adheres to the previous layer with an adequate bond upon solidification and which can be supplied as a flexible filament is used as the modeling material Motor-driven feed rollers advance the strand of filament into a liquifier carried by an extrusion head. Inside the liquifier, the filament is heated to a flowable temperature. Flowable modeling material is forced out of a nozzle on the far end of the liquifier, and deposited from the liquifier onto a base. The flow rate of the material extruded from the nozzle is a function of the rate at which the filament is advanced to the extrusion head. A controller controls movement of the extrusion head in a horizontal x, y plane, controls movement of the base in a vertical z-direction, and controls the rate at which the feed rollers advance filament. By controlling these processing variables in synchrony, the modeling material is deposited in "beads" layer-by-layer along tool paths defined from the CAD model. The material being extruded fuses to previously deposited material and solidifies to form a three-dimensional object resembling the CAD model.

The surfaces of objects developed from layered manufacturing techniques of the current art are textured or striated due to their layered formation. Curved and angled surfaces generally have a "stair step" appearance, caused by layering of cross-sectional shapes which have square edge profiles. The stair-stepping effect is more pronounced as layer thickness increases. Although the stair-stepping does not effect the strength of the object, it does detract aesthetically.

Surface roughness of objects created by layered manufacturing techniques also arises from errors in the build process. For example, in the fused deposition modeling systems of the current art, errors can arise due in part to inconsistent extrusion flow rates. Errors particularly occur at start points and end points of the tool path, for instance, at the location of a "seam" (i.e., the start and end point of a closed-loop tool path). These errors can cause undesired inconsistencies in the shape of the resulting model.

Rapid prototyping of three-dimensional objects includes not only the production of prototype parts, but also may include the production of molds. Exemplary uses of molds created with rapid prototyping include forming molds used to create injection molding tool inserts such as described in U.S. Pat. No. 5,189,781, and forming fugitive molds for green ceramic pieces prior to sintering such as described in U.S. Pat. Nos. 5,824,250 and 5,976,457.

The current art teaches manually trimming, machining or grinding objects formed by layered manufacturing to remove excess material. Buffing with cloths, sand paper or solution-born abrasives are current methods of smoothing or polishing the objects. For example, Hull et al. U.S. Pat. No. 5,059,359, Methods and Apparatus for Producing Three-dimensional Objects by Stereolithography, describes their prototypes as "perfect for smoothing by sanding to yield the right-sized part". The need for hand-finishing of models made from additive process techniques is also recognized in U.S. Pat. No. 6,021,358, which utilizes subtractive modeling techniques to attain smooth models. There is a need in rapid prototyping systems of an expedient and relatively inexpensive method of post-processing layered manufacturing prototype objects.

A previously developed technique used in manufacturing of plastics involves the use of chemical vapors or liquids to smooth by reflowing the surface of the plastic, termed solvent polishing. Solvent polishing was developed in the plastics industry over twenty years ago for the purpose of developing a smooth level and/or high gloss coating or surface without needing to exercise extreme care in the application or manufacturing of the items. For example, U.S. Pat. No. 3,437,727 discloses a method using chemical vapors for refinishing telephones that were returned to the telephone company as a method of recycling them.

There are two standard methods for solvent polishing articles. The first is to immerse the entire plastic article in a bath of liquid plastic solvent for a period of time based on the solvent and type of plastic involved. This allows the solvent to penetrate the outer layer of the plastic, thereby causing it to reflow. Reflowing causes the outer surfaces of the plastic article to become smooth and/or shiny.

The second method of solvent polishing is the exposure of the plastic article to vaporized solvent. A handheld vaporizer as shown in U.S. Pat. No. 4,260,873 may be used to expose the plastic object. Alternatively, the object can be placed into a chamber filled with a vaporized solvent, generated from a heated bath below, as in U.S. Pat. No. 3,737,499. An advantage of the vaporizing chamber is that the solvent is contained and can be recycled, thereby minimizing potential environmental pollution.

The use of hot solvent vapors to melt or plasticize the surface of the substrate has been used in the circuit board manufacturing area to facilitate the transfer of printed circuits, as disclosed, for example, in U.S. Pat. No. 4,976,813. Another example is disclosed in U.S. Pat. No. 4,594,311, where solvent vapor is used to treat the non-imaged areas of the plastic base material which holds a printed circuit board in order to further enhance the printed pattern and secure it more strongly to the surface. In U.S. Pat. No. 5,045,141, a substrate, typically a circuit board, may be treated to facilitate transfer of the printed circuit to it.

Solvent polishing using liquid or vapors is also commonly used as a degreasing or cleaning step in manufacturing processes, especially prior to painting.

Despite the need in rapid prototyping for an expedient and inexpensive surface finishing technique, Applicant is unaware of any teaching or suggestion in the prior art to use a vapor polishing technique for the smoothing of objects formed by layered manufacturing rapid prototyping techniques.

BRIEF SUMMARY OF THE INVENTION

The present invention is a method for smoothing the surface of an object built from a polymeric or wax material using a layered manufacturing rapid prototyping technique. After the object is built, it is exposed to a vaporized solvent for an exposure time sufficient to reflow the object surface. A solvent is chosen based on its ability to transiently soften the material which forms the object, and thereafter evaporate off the object. The object is removed from the solvent and allowed to dry, producing a smooth finished part. Optionally, portions of the object surface may be masked prior to exposing the object to solvent, so as to preserve fine details of the object. Alternatively, portions of the object surface may be pre-distorted prior to exposing the object to solvent, so that said surface portions will attain a desired geometry following vapor smoothing.

DETAILED DESCRIPTION

The method of the present invention may be employed with respect to objects formed from a polymeric or wax material using layered manufacturing rapid prototyping techniques. An exemplary layered manufacturing technique is the type disclosed in U.S. Pat. No. 5,121,329, wherein an extrusion head deposits "roads" of molten material in layers of predetermined shape, and which material solidifies upon a drop in temperature to form a solid model.

Figure 1:
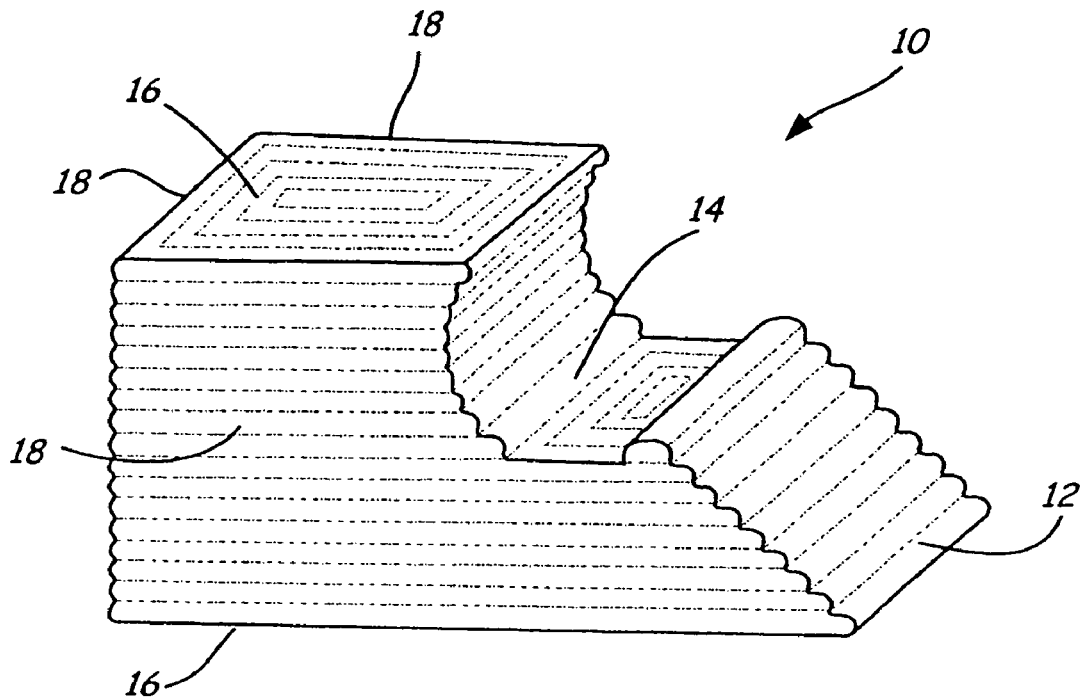
FIG. 1 is a perspective, magnified view illustrating a raw object formed by a layered manufacturing rapid prototyping technique.

FIG. 1 shows an exemplary object 10, formed by a layered manufacturing rapid prototyping technique. The object 10 has an angled surface 12, a curved surface 14, two horizontal surfaces 16, and three vertical surfaces 18. In another embodiment, the object may be a mold tool for use in making prototype plastic injection molded parts, such as is disclosed in International Application No. PCT/US03/010219 entitled "Layered Deposition Bridge Tooling", S. Crump and J. Hanson, filed on even date herewith and assigned to the same assignee as the present application. The object 10 is made of a polymeric or wax modeling material, which may also include fillers and other additives as well as dispersed particulate materials. Amorphous thermoplastics are particularly suited for use in the present invention, for instance, ABS, polycarbonate, polyphenylsulfone, polysulfone, polystyrene, polyphenylene ether, amorphous polyamides, acrylics, poly(2-ethyl-2-oxazoline), and blends thereof. The present invention may also be used to advantage with other polymeric and wax materials, including glass-filled nylon, jetting wax, sintered thermal plastic powders, and green metals or green ceramics dispersed in a polymeric binder.

As shown in FIG. 1, the object 10 is "raw", that is, it has not undergone post-process smoothing. Prior to vapor smoothing in accordance with the present invention, surfaces 12 and 14 exhibit a stair-stepping effect. Surfaces 16 and 18 exhibit striation and roughness. Additionally, object 10 exhibits porosity due to the fused deposition modeling technique.

Figure 3:
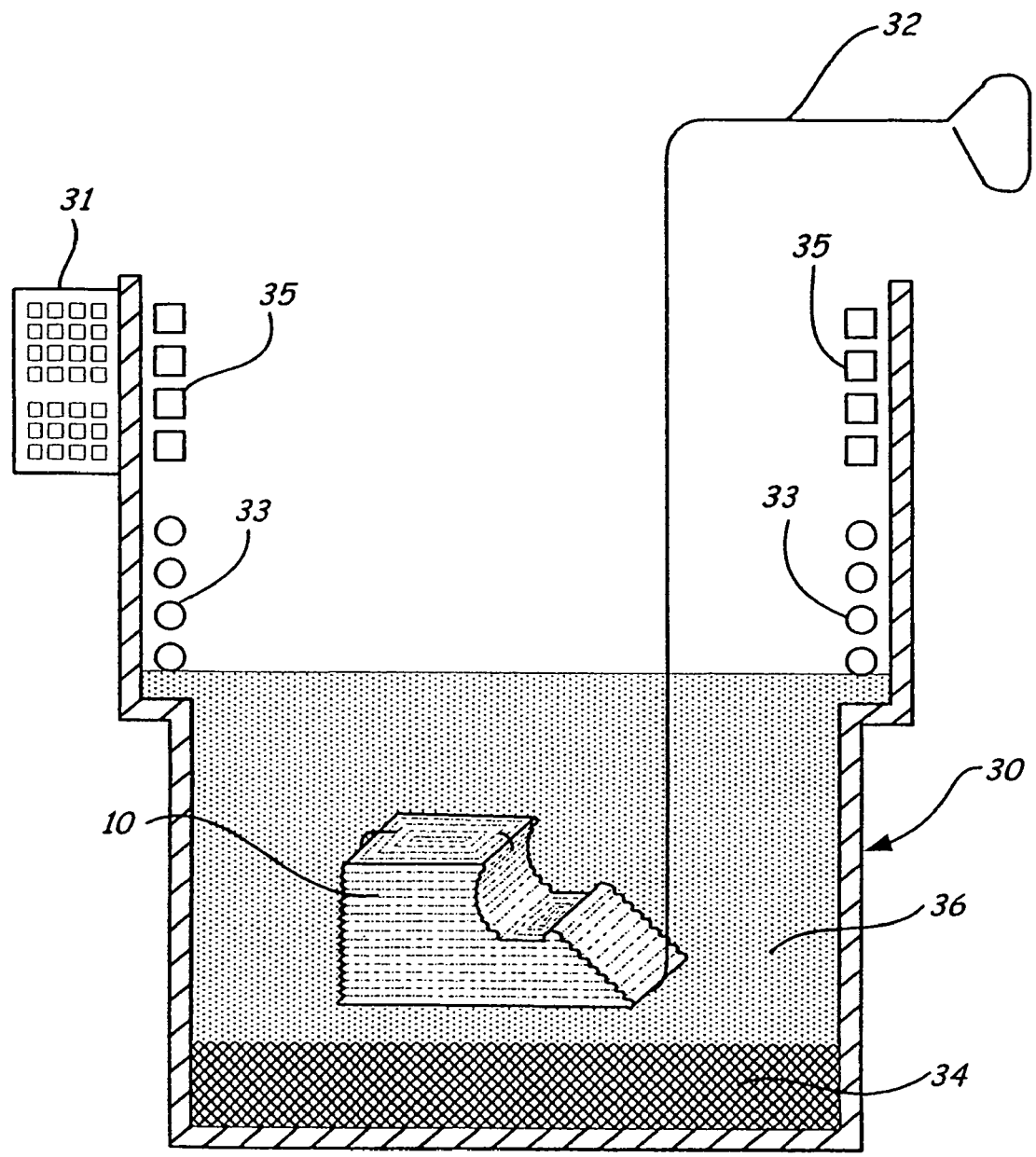
FIG. 3 is a diagrammatic view illustrating the process of vapor smoothing an object in accordance with the present invention.

To smooth the surfaces of object 10, the object 10 is placed in a vaporizer 30, where it is exposed to vapors of a solvent 34. This is illustrated in FIG. 3. A suitable vaporizer is of the type available from Detrex Corp. of Southfield, Mich., model VS-2000, although those skilled in the art will recognize that many alternative vaporizers can be used in practicing the present invention. Vaporizer 30 is shown as having a control panel 31 for controlling operation of the vaporizer, and primary and secondary cooling coils, 33 and 35, respectively.

The solvent 34 is selected to be compatible with the modeling material which forms the object 10. Suitable solvents will react with the modeling material so as to soften and flow the material at the object surfaces. The solvent should also be able to vaporize off the surface of the object, leaving the object intact and unscathed. A preferred solvent for use with a wide range of amorphous thermoplastics is methylene chloride. Other suitable solvents will be recognized by those skilled in the art, for instance, an n-Propyl bromide solution (e.g., Abzol®), perchloroethylene, trichloroethylene, and a hydrofluorocarbon fluid sold under the name Vertrel®.

As illustrated in FIG. 3, the vaporizer 30 boils the solvent 34 into a vapor zone 36, which is maintained at or above the boiling point of the solvent and contained by the cooling coils 33 and 35. The object 10 is suspended in the vapor zone 36, held by a wire skewer 32, which is bent to fit around the object. Alternative holding means may also be used, such as a basket, a net or a mesh platform. The object 10 is exposed to the vaporized solvent 34, allowing vapors of the solvent 34 to penetrate the surfaces 12, 14, 16 and 18 of object 10. Penetration of the solvent 34 softens the modeling material at the object surfaces, so that the surface material may reflow. Reflowing of the material smoothes the object surfaces.

The object 10 remains exposed to the vapors of solvent 34 until a desired surface finish is obtained. An exposure time is selected based on the type of solvent and modeling material, the fineness of the object features, and the concentration of the solvent vapors. The exposure time can be gauged by observing condensation of solvent vapors on the object, or can be pre-selected according to a formula. Condensation will stop when the temperature of the object surface reaches the temperature of the boiling solvent. This is an indication that solvent penetration has occurred. Using methylene chloride as the solvent 34, an amorphous thermoplastic modeling material will soften and reflow in a short time, typically between about 0.1 seconds to 5 minutes exposure time. If smoothing of an object is expected to occur in a short exposure time, it may be desirable to reduce the concentration of solvent vapors so that the exposure time can be increased. A longer exposure time allows an operator more time to observe the smoothing process and more room for error in removing the object from the solvent vapors.

When the exposure time elapses, the object 10 is removed from the vapor zone 36 and allowed to dry. In a preferred embodiment, the object 10 dries within seconds to minutes after its removal from the vapor zone 36, as the solvent 34 evaporates off of the object 10. The object 10 may then be handled, as it is not sticky, soft or wet. In some cases, such as where solvent exposure time is great or the solvent is highly concentrated, it may be desirable to dry the object 10 in an oven to remove any residual solvent. Oven drying should be done at a temperature greater than the boiling point of the solvent.

Figure 2:
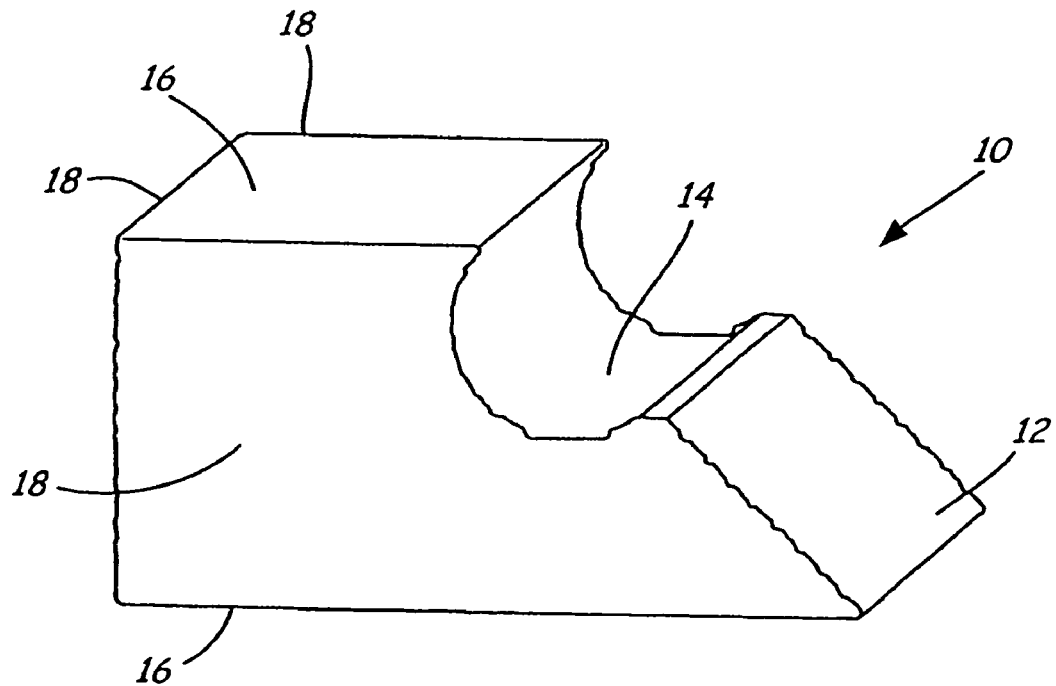
FIG. 2 is a perspective, magnified view of the object shown in FIG. 1, after undergoing vapor smoothing.

Following the vapor smoothing process, the stair steps in surfaces 12, 14, 16 and 18 of object 10 are either significantly reduced or eliminated. The extent of the smoothing achieved for a given object using the method of the present invention will depending upon the exposure time, the solvent, the modeling material, and the initial surface condition of the object. FIG. 2 illustrates a significant reduction in the stair steps and roughness of the object 10, achieved by vapor smoothing. Following the vapor smoothing process, the porosity of object 10 in surfaces 12, 14, 16 and 18 is also either reduce or eliminated.

Optionally, selected features of an object (e.g., features smaller than 0.25 inches, thin walls, corners, convex edges and concave edges) can be masked with a substance that will inhibit smoothing of said selected portions, or, exposure of said selected features to the solvent vapors can be otherwise avoided. For example, it may be desirable to mask the corners of object 10, to prevent the corners from rounding. Similarly, concave surfaces of an object can be masked to prevent in-flow of surrounding material. Suitable solvent masking substances include those used in printed circuit board manufacturing, such as gums, waxes, pastes, adhesives or masking tape, which may be applied either manually or automatically. Masking may also be accomplished by surrounding a feature with a gas.

Automatic application of a masking substrate may be done, for example, by jetting a masking material onto the surface of selected object features, in a layered deposition process such as is known in the art. A masking substance may also be applied by depositing roads of masking material, using a fused deposition modeling process such as performed by Stratasys® FDM® modeling machines. Those skilled in the art will recognize additional masking techniques know in the art, that may be applied in carrying out the present invention.

When an automatic masking technique is used, the features to be masked may be identified using a software algorithm that creates a digital representation of the surface area to be protected. The protected area may be identified in a digital representation of the object, such as in an .stl file geometry using a CAD system, a Graphic Pixel system or a Voxel system. Alternatively, the surface areas to be masked may be identified by the user via a haptic input interface, such as a FreeForm™ system available from SensAble Technologies, Inc. The haptic input system creates a digital mask of the areas for which smoothing is not desired.

As an alternative to masking techniques, the geometry of an object surface may be pre-distorted in anticipation of the vapor smoothing. The pre-distortion is accomplished by using a software algorithm to modify a digital representation of the object (e.g., a CAD model of the object or a sliced representation of the object as in a .stl file). Using a pre-distortion software algorithm, feature details are distorted so as to overbuild corners and edges, and underbuild pockets, such that following vapor smoothing such features will attain approximately the desired geometry. More specifically, an exemplary pre-distortion algorithm will: (1) identify geometric features with radii of curvature equal to or smaller than the slice height (i.e., the thickness of a layer); (2) for identified features having a positive radius of curvature (e.g., a corner or edge), the algorithm will build up the initial object representation at such features; and (3) for identified geometric features having a negative radius of curvature (e.g., a pocket or a joint between planes), the algorithm will hollow out the object representation in the vicinity of such features. The pre-distortion software algorithm thus creates a modified object representation, so that the identified geometric features will be distorted by either depositing additional material or depositing less material than is ultimately desired in the final smoothed object. A similar algorithm can be used to identify features for masking.

According to the pre-distortion algorithm, features should be built up by not more than the slice height, for instance, by half of a slice height. The surface roughness of a typical part made by fused deposition modeling is about 0.3 times the slice height. The additional material added in pre-distortion of positive features may be roughly the thickness of this surface roughness, so that when the reflowed material is pulled away, the solid material left takes on the desired final object geometry. For the negative curvature regions, enough material needs to be removed by the pre-distortion algorithm that the in-flow from the surrounding regions fills in the removed material.

Figure 4A:
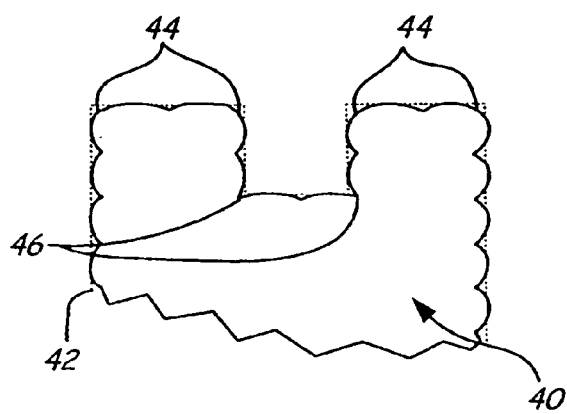
FIG. 4a is a cross-sectional detailed view of a portion of a raw object formed by fused deposition modeling.
Figure 4B:
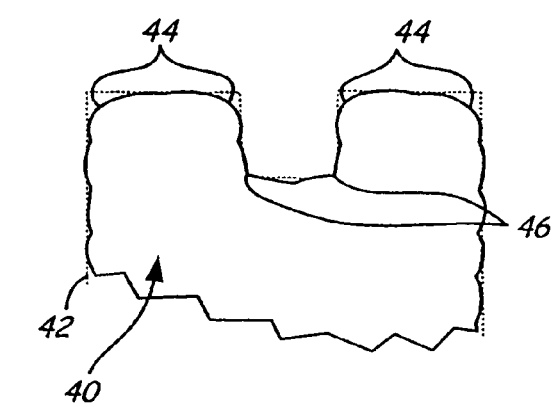
FIG. 4b shows the object cross-section of FIG. 4a after vapor smoothing.
Figure 5A:
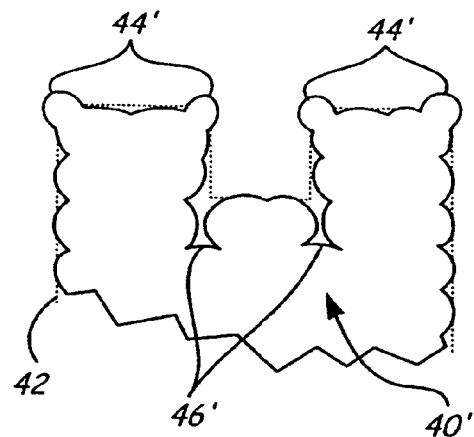
FIG. 5a is a cross-sectional detailed view of the object portion shown in FIG. 4a, wherein the object geometry has been pre-distorted in anticipation of vapor smoothing.
Figure 5B:
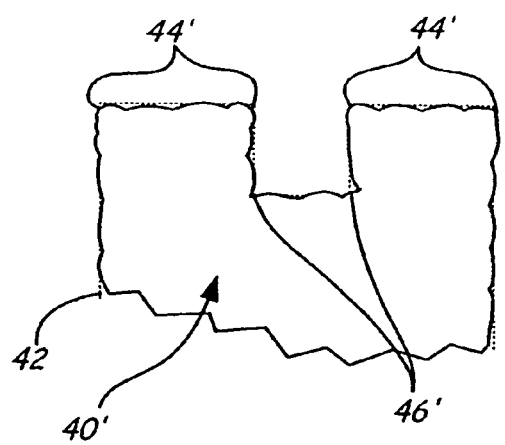
FIG. 5b shows the object cross-section of FIG. 5a after vapor smoothing.

Pre-distortion of object geometry is illustrated in FIGS. 4a and 4b and FIGS. 5a and 5b. FIGS. 4a and 4b show a cross-sectional view of a portion of an object 40 that has not been pre-distorted, superimposed onto an outline 42 illustrating the desired final surface object geometry of object 40 (i.e., the unmodified object representation). As illustrated in FIG. 4b, vapor smoothing results in rounding of convex corners 44 away from the desired outline 42, and rounding of edges 46 beyond the desired outline 42. FIGS. 5a and 5b illustrate a portion of an object 40' which has the same desired final surface geometry as object 40. Unlike object 40, object 40' has been pre-distorted according to the pre-distortion algorithm of the present invention. As illustrated in FIG. 5a, the pre-distorted surface geometry of object 40 extends beyond the desired outline 42 at corners 44 and concave edges 46. Following vapor smoothing, as illustrated in FIG. 5b, the corners 44 and edges 46 of the pre-distorted object 40 more closely follow the desired outline 42 than do the corners 44 and edges 46 of the object 40.

Although the present invention has been described with reference to preferred embodiments, workers skilled in the art will recognize that changes may be made in form and detail without departing from the spirit and scope of the invention.

The invention claimed is:

1. A method for making a three-dimensional object comprising the steps of:
providing an object built from a modeling material using a fused deposition modeling technique, wherein the modeling material comprises a thermoplastic resin, wherein the built object has an object surface formed of the modeling material, the object surface having at least one surface effect due to the fused deposition modeling technique that extends substantially across an entirety of the object surface, wherein the at least one surface effect comprises a stair step effect, striation, or a combination thereof, and wherein the object exhibits porosity due to the fused deposition modeling technique; placing the object in a vessel;

exposing substantially the entire object surface to vapors of a solvent that transiently softens the modeling material at the object surface while the object resides in the vessel in a solvent vapor zone present below cooling elements in the vessel;

reflowing the softened modeling material to reduce the at least one surface effect and to reduce the porosity of the object at the object surface;

observing condensation of the solvent vapors on the object surface while reflowing the softened modeling material;

discontinuing the exposure of the object surface to the solvent vapors after the condensation of the solvent vapors stops; and drying the object after discontinuing the exposure, wherein the object surface of the dried object is substantially free of the at least one surface effect and is substantially free of the porosity.

2. The method of claim 1, wherein the thermoplastic resin comprises at least about 50 weight percent of an amorphous thermoplastic selected from the group consisting of ABS, polycarbonate, polyphenylsulfone, polysulfone, polystyrene, polyphenylene ether, amorphous polyamides, acrylics, poly (2-ethyl-2-oxazoline), and blends thereof.

3. The method of claim 2, wherein the solvent is selected from the group consisting of methylene chloride, an n-Propyl bromide solution, perchloroethylene, trichloroethylene, and a hydrofluorocarbon fluid.

4. The method of claim 1, and further comprising the step of:
masking selected portions of the object surface with a substance that will inhibit smoothing of the selected portions, prior to the step of exposing the object to the vapors of the solvent.

5. The method of claim 1, and further comprising building the object using the fused deposition modeling technique.

6. The method of claim 1, and further comprising the step of:
suspending the object in the vessel containing the vapors of the solvent in a manner that substantially allows the entirety of the object surface to be exposed to the vapors of the solvent.

7. The method of claim 1, and further comprising the steps of:
providing an initial object representation in a digital format, the initial object representation having a surface geometry; and
modifying the initial object representation to pre-distort certain features of the surface geometry, producing a modified object representation;
wherein the object built in the building step has a geometry defined according to the modified object representation; and
wherein the desired geometry attained following the exposing step approximately matches that of the initial object representation.

8. A method for making a three-dimensional object comprising the steps of:

providing an object built from a plurality of layers with a modeling material using a fused deposition modeling technique, wherein the modeling material comprises a thermoplastic resin, wherein the object has an object surface, and wherein the plurality of layers create at least one surface effect extending substantially across an entirety of the object surface, wherein the at least one surface effect comprises a stair step effect, striation, or a combination thereof, and wherein the object exhibits porosity due to the fused deposition modeling technique; placing the object in a vessel;

exposing substantially the entire object surface to vapors of a solvent while the object resides in the vessel in a solvent vapor zone present below cooling elements in the vessel;

penetrating the object surface with the vapors of the solvent to soften the modeling material at the object surface;

reflowing the softened modeling material to reduce the at least one surface effect substantially across the entirety of the object surface and to reduce the porosity of the object at the object surface;

observing condensation of the solvent vapors on the object surface while reflowing the softened modeling material;

discontinuing the exposure of the object surface to the solvent vapors after the condensation of the solvent vapors stops; and drying the object after discontinuing the exposure, wherein the object surface of the dried object is substantially free of the at least one surface effect and is substantially free of the porosity.

9. The method of claim 8, wherein the thermoplastic resin comprises at least about 50 weight percent of an amorphous thermoplastic selected from the group consisting of ABS, polycarbonate, polyphenylsulfone, polysulfone, polystyrene, polyphenylene ether, amorphous polyamide, methyl methacrylate, poly(2-ethyl-2-oxazoline), and blends thereof.

10. The method of claim 8, and further comprising the step of:
masking selected portions of the object surface with a substance that will inhibit smoothing of the selected portions, prior to the step of reflowing the surface.

11. The method of claim 10, wherein the masking substance is applied using an automatic process selected from the group consisting of a jetting process and a fused deposition modeling process.

12. The method of claim 8, wherein the solvent is selected from the group consisting of methylene chloride, an n-Propyl bromide solution, perchloroethylene, trichloroethylene, a hydrofluorocarbon fluid, and combinations thereof.

13. A method for treating a three-dimensional object, the method comprising:
providing the three-dimensional object, the three-dimensional object being previously built from a modeling material comprising a thermoplastic resin using a fused deposition modeling technique, wherein the three-dimensional object comprises an exterior surface having at least one surface effect caused by the fused deposition modeling technique that extends substantially across an entirety of the exterior surface, wherein the at least one surface effect comprises a stair-step effect created by layering of a plurality of layers of the modeling material, striation created by formation of roads of the modeling material, or a combination thereof, and wherein the three-dimensional object exhibits porosity due to the fused deposition modeling technique;
placing the three-dimensional object in a vessel configured to contain solvent vapors;

while the three-dimensional object resides in the vessel, exposing substantially the entire exterior surface of the three-dimensional object while the object is in a solvent vapor zone present below cooling elements in the vessel to the solvent vapors, wherein the solvent vapors transiently soften the modeling material across the entire exposed exterior surface of the three-dimensional object;

observing condensation of the solvent vapors on the exterior surface of the three-dimensional object while the exterior surface of the three-dimensional object is exposed to the solvent vapors;

removing the three-dimensional object from the vessel after the condensation of the solvent vapors on the exterior surface of the three-dimensional object stops; and drying the three-dimensional object after removing the three-dimensional object from the vessel, wherein the entire exposed exterior surface of the dried three-dimensional object is substantially free of the at least one surface effect and is substantially free of the porosity.

14. The method of claim 13, wherein the vessel is configured to be maintained at or above a boiling point of a solvent of the solvent vapors.

15. The method of claim 13, wherein the thermoplastic resin is selected from the group consisting of ABS, polycarbonate, polyphenylsulfone, polysulfone, polystyrene, polyphenylene ether, amorphous polyamides, acrylics, poly (2-ethyl-2-oxazoline), and blends thereof.

16. The method of claim 13, wherein the solvent is selected from the group consisting of methylene chloride, an n-Propyl bromide solution, perchloroethylene, trichloroethylene, a hydrofluorocarbon fluid, and combinations thereof.

17. The method of claim 13, wherein placing the three-dimensional object in the vessel comprises suspending the three-dimensional object in the vessel.

18. The method of claim 13, and further comprising masking selected portions of the exterior surface with a substance that will inhibit smoothing of the selected portions.

* * * * *